United States Patent
Dutt et al.

(10) Patent No.: US 8,458,062 B2
(45) Date of Patent: Jun. 4, 2013

(54) REAL-TIME PRODUCT MATCHING

(75) Inventors: Rajsaday Dutt, Glen Allen, VA (US); Yousef Gibran Master, Richmond, VA (US)

(73) Assignee: Capital One Financial Corporation, McLean, VA (US)

(*) Notice: Subject to any disclaimer, the term of this patent is extended or adjusted under 35 U.S.C. 154(b) by 655 days.

(21) Appl. No.: 11/502,547

(22) Filed: Aug. 11, 2006

(65) Prior Publication Data

US 2008/0065569 A1    Mar. 13, 2008

(51) Int. Cl.
G06Q 40/00    (2012.01)
G06Q 30/02    (2006.01)

(52) U.S. Cl.
CPC ..................... G06Q 30/02 (2013.01)
USPC ........................................................... 705/35

(58) Field of Classification Search
USPC ........................................................... 705/35
See application file for complete search history.

(56) References Cited

U.S. PATENT DOCUMENTS

| | | | |
|---|---|---|---|
| 5,765,144 A | 6/1998 | Larche et al. | |
| 5,878,403 A * | 3/1999 | DeFrancesco et al. | 705/38 |
| 5,940,812 A * | 8/1999 | Tengel et al. | 705/38 |
| 5,970,478 A | 10/1999 | Walker et al. | |
| 6,014,645 A * | 1/2000 | Cunningham | 705/38 |
| 6,088,686 A | 7/2000 | Walker et al. | |
| 6,324,524 B1 | 11/2001 | Lent et al. | |
| 6,374,230 B1 | 4/2002 | Walker et al. | |
| 6,385,594 B1 | 5/2002 | Lebda et al. | |
| 6,422,462 B1 | 7/2002 | Cohen | |
| 6,611,816 B2 | 8/2003 | Lebda et al. | |
| 8,145,522 B2 * | 3/2012 | Warren et al. | 705/14.17 |
| 2002/0013711 A1 * | 1/2002 | Ahuja et al. | 705/1 |
| 2002/0069122 A1 | 6/2002 | Yun et al. | |
| 2002/0069158 A1 | 6/2002 | Larkin et al. | |
| 2002/0069159 A1 | 6/2002 | Talbot et al. | |
| 2002/0143680 A1 | 10/2002 | Walters et al. | |
| 2002/0194094 A1 * | 12/2002 | Lancaster et al. | 705/35 |
| 2003/0033242 A1 * | 2/2003 | Lynch et al. | 705/38 |
| 2003/0208412 A1 * | 11/2003 | Hillestad et al. | 705/26 |
| 2004/0205019 A1 * | 10/2004 | Painter et al. | 705/38 |
| 2004/0215547 A1 * | 10/2004 | Nazari et al. | 705/36 |
| 2006/0080233 A1 | 4/2006 | Mendelovich et al. | |
| 2006/0265259 A1 * | 11/2006 | Diana et al. | 705/7 |
| 2008/0016551 A1 * | 1/2008 | Pinkas et al. | 726/2 |

OTHER PUBLICATIONS

Fuhrman, Alan, Your e-banking future, Apr. 2002, Strategic Finance, pp. 24-29.*

(Continued)

*Primary Examiner* — Rajesh Khattar
*Assistant Examiner* — Carol See
(74) *Attorney, Agent, or Firm* — Finnegan, Henderson, Farabow, Garrett & Dunner, L.L.P.

(57) ABSTRACT

A system and method for providing real time financial product matching is disclosed. In one embodiment, the real time financial product matching system may store one or more financial product data records. Each financial product data record may be associated with a financial product. The real time financial product matching system may receive a customer data record associated with a customer, the customer data record including a customer preference related to financial products. The real time financial product matching system may then match the customer with one or more financial products in real time by comparing the customer data record to the one or more financial product data records. And, the real time financial product matching system may present the matched one or more financial products to the customer in real time.

20 Claims, 8 Drawing Sheets

OTHER PUBLICATIONS

PCT International Search Report issued in a related PCT Application No. PCT/US02/08269; Jan. 27, 2003; 6 pages.

NextCard: NextCard Offers Fully Customized Visa on Internet, http://www.nextcard.com/pa cardnew... 3759946186826311366704863095700510, dated Mar. 1, 1999, and printed on Mar. 31, 2000.

Customized Card Finder Report, www.cardoffers.com/partners/links/CPA/cardfinder/form.asp?tempid=235300, pp. 1-4, visited May 15, 2006.

* cited by examiner 180-1

| Customer A | |
|---|---|
| Name: Joe Smith | |
| Address: | 124 Richmond Street<br>Washington, DC 20008 |
| Credit rating (self assess): | excellent |
| Length of Credit History (self assess): | over 5 years |
| • <br> • <br> • | |

Credit Card A

Qualification criteria:

over 5 years credit history
- 
- 
-

Product definition:

| | |
|---|---|
| APR: | Prime +0% |
| Annual Fee: | None |
| Benefits: | Credit limit up to $30,000; |
| | No balance transfer fees; |
| | Choose your own card design |

- 
-

180-2-2

Credit Card B

Qualification criteria:

Zip code first three digits equal to "200"
- 
- 
-

Product definition:

| | |
|---|---|
| APR: | $6 monthly fee per $1,000 balance |
| Annual Fee: | None |
| Benefits: | Credit limit up to $30,000; |
| | No balance transfer fees; |
| | No overtime fees or past due fees |

First Name | MI | Last Name
Jane | | Doe — 410

Address (No P.O. Boxes)
125 New York Ave — 420

Address Line 2

City | State | Zip Code
Washington | DC | 20001 — 430

Last four digits of Social Security Number
2629 — 435

What's the primary feature you are seeking in a credit card? — 440
○ Travel & merchandise rewards
◉ Cash back on purchases
○ Lower interest rate How would you evaluate your credit history? — 450
◉ Excellent Credit
○ Above Average          451
○ Needs Some Improvement
○ Limited Credit History (1) I have had a loan or credit card for at least 3 years (2) I have a credit card with a credit limit greater than $10,000

(3) I have NEVER been more than 60 days late on a credit card, medical bills or loan payment (4) I have never declared bankruptcy Are you currently a student?
○ Yes
◉ No Are you interested in transferring a balance from another credit card or loan?
◉ Yes
○ No How long would you estimate you have had a credit card or loan? — 460
○ More than five years
◉ Three to five years
○ Less than three years To assure your security, please type the word exactly as shown in the picture below.
— 470

— 480

☐ I understand this is not an application for credit.
FindMyCard — 490

FIG. 4

|  | Answer Vector | Customer B |
|---|---|---|
| How would you rate your credit? 501 | | |
| Excellent | 1 | 1 |
| Fair | 0 | |
| Poor | 0 | |
| 502 | | |
| What feature do you like most about cards? | | |
| Miels awards | 1 | 1 |
| Cash back | 0 | |
| Low APR | 0 | |
| Access to credit | 0 | |
| 503 | | |
| Are you currently a student? | | |
| Yes | 1 | 1 |
| No | 0 | |

510 = Answer Vector column; 520 = Customer B column; 530, 540, 550 row groups.

FIG. 5A

|  | Card F (miles award) | Card G (low fee) |
|---|---|---|
| How would you rate your credit? 501 | | |
| Excellent | 1 | 0.25 |
| Fair | 0.25 | 1 |
| Poor | 0 | 0.5 |
| 502 | | |
| What feature do you like most about cards? | | |
| Miels awards | 1 | 0 |
| Cash back | 0.5 | 0 |
| Low APR | 0.1 | 0.5 |
| Access to credit | 0.5 | 1 |
| 503 | | |
| Are you currently a student? | | |
| Yes | 0.5 | 0.25 |
| No | 0.5 | 0.75 |

560 = Card F column; 570 = Card G column.

FIG. 5B

Dear Jane Doe:

Congratulations! Based upon the information you provided, we have found the following pre-qualified card offers for you.

If these are not right for you, click here to see other products.

|  | Credit Card B  (Apply Now) Get more information | Credit Card C  (Apply Now) Get more information | Credit Card D  (Apply Now) Get more information | Credit Card E  (Apply Now) Get more information |
|---|---|---|---|---|
| APR | Prime +0% (currently equal to 7.25%) APR | No confusing interest; $6 monthly fee per $1000 of account balance | Variable purchase and balance transfer rate, currently 7.9% | Non-introductory variable purchase and balance transfer rate, currently 7.9% |
| Annual Fee | No annual membership fee | No annual membership fee | No annual membership fee | No annual membership fee |
| Benefits | • Credit limit up to $30,000◊<br>• No balance transfer fees<br>• Choose your own card design | • Credit limit up to $30,000◊<br>• No balance transfer fees<br>• No overlimit fees or past due fees | • No pre-set spending limit◊<br>• No balance transfer fees<br>• Earn two miles on each dollar you spend on purchases* | • Credit limit up to $30,000◊<br>• No balance transfer fees<br>• Get 2% cash back on gas and groceries; 1% cash back on other purchases* |

FIG. 6

REAL-TIME PRODUCT MATCHING

DESCRIPTION OF THE INVENTION

1. Field of the Invention

The present invention relates to methods and systems for providing financial products and services, and more particularly for providing customers a selection of prequalified financial products in real time.

2. Background of the Invention

When customers apply for a financial product, such as a credit card or a loan, they have no means of knowing whether they are qualified for the product before they submit an application. Conventional systems used by financial institutions first pre-select customers for financial product offerings. A pre-selected customer may be prequalified for one or more offered products. Offers for financial products are then sent to the prequalified customers. Accordingly, in order for a customer to identify the most beneficial offer, the customer would need to manually compare the different offers. To do so, the customer may need to save the offers from financial institutions. As such, there is a need to provide customers real time comparisons of prequalified financial products to allow the customers to select the most beneficial financial product offered by a financial institution.

SUMMARY OF THE INVENTION

A system and method for providing real time financial product matching is disclosed. In one embodiment, the real time financial product matching system may store one or more financial product data records. Each financial product data record may be associated with a financial product. The real time financial product matching system may receive a customer data record associated with a customer, the customer data record including a customer preference related to financial products. The real time financial product matching system may then match the customer with one or more financial products in real time by comparing the customer data record to the one or more financial product data records. And, the real time financial product matching system may present the matched one or more financial products to the customer in real time.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 2B is a block diagram of an exemplary customer data record consistent with certain disclosed embodiments of the present invention;

FIG. 2C is a block diagram of two exemplary financial product data records consistent with certain disclosed embodiments of the present invention;

FIG. 4 is an exemplary customer data record consistent with certain disclosed embodiments of the present invention;

FIG. 5A is a table with data describing a three-dimensional vector consistent with certain disclosed embodiments of the present invention;

FIG. 5B is a table with data describing two three-dimensional vectors related to two credit cards consistent with certain disclosed embodiments of the present invention; and FIG. 6 is an exemplary selection of financial products presented to a customer consistent with certain disclosed embodiments of the present invention.

DETAILED DESCRIPTION

Figure 1:
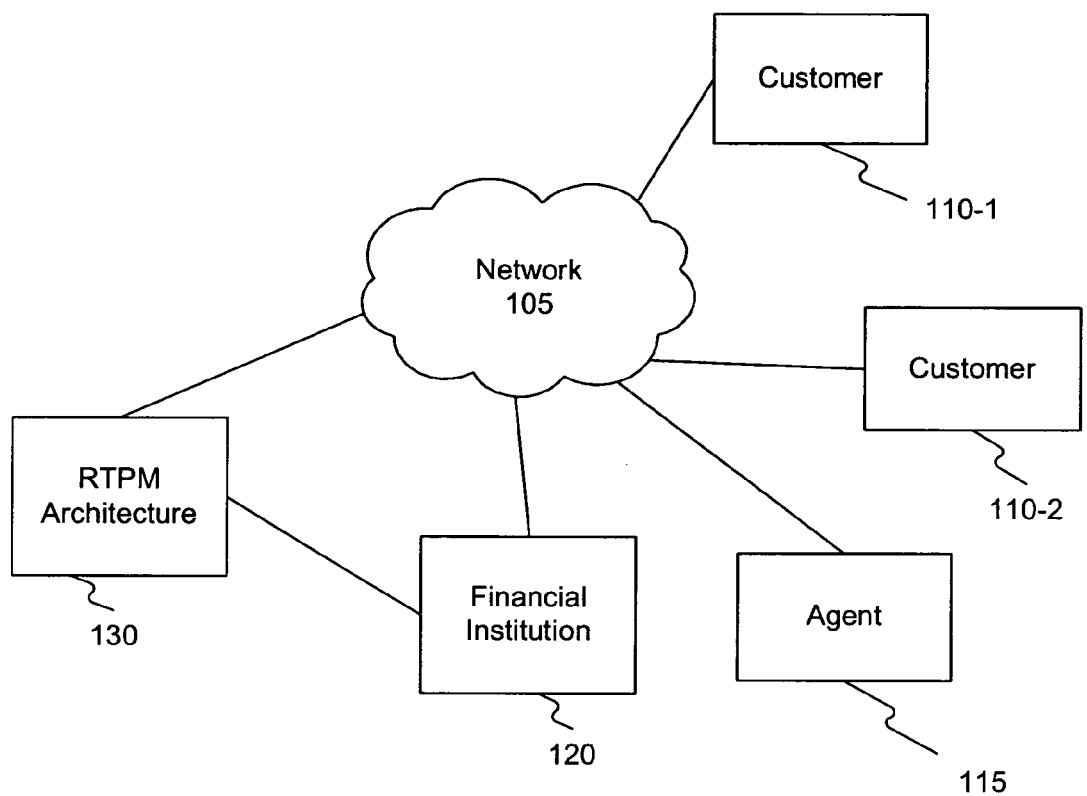
FIG. 1 is a block diagram of an exemplary environment for providing real time financial product matching consistent with certain disclosed embodiments of the present invention.

The following detailed description refers to the accompanying drawings. Wherever possible, the same reference numbers are used in the drawings and the following description when referring to the same or similar parts. While several exemplary embodiments and features of the invention are described herein, modifications, adaptations, and other implementations are possible without departing from the spirit and scope of the invention. Accordingly, the following detailed description does not limit the invention. Instead, the proper scope of the invention is defined by the appended claims.

In this disclosure, the phrase "and/or" as used in this application with regard to a list of items means that any one of the items may constitute the described group of items or alternatively any combination of the items may constitute the described group. A financial institution may be any organization that deals with the management of money. A financial institution may be a bank, an insurance company, a credit card company, etc. A financial product may refer to any product or service offered by a financial institution, such as a loan, a credit card, an insurance policy, a mortgage, a checking account, a credit card, a debit card, a prepaid card, and the like. A customer may be an individual, a group of individuals, or an organization that may be interested in one or more financial products offered by one or more financial institutions, such as a bank, credit card provider, or other type of business that provides financial products.

In one embodiment, a customer may prequalify for a financial product offered by a financial institution. To do so, a financial institution may perform a prequalification process that includes collecting information from the customer to make a tentative decision regarding whether the customer qualifies for a financial product. The financial institution may determine whether a customer qualifies for a financial product. For example, the financial institution may collect and verify information recovered from the customer by checking the customer's credit rating/credit history data. The financial institution may then decide whether the customer qualifies for the financial product based on the verified customer and credit information. This process may be referred to as a qualification process.

Further, in this disclosure, a financial institution may perform a prequalification process by collecting information from a customer, a credit bureau, and/or other sources. The financial institution may identify a product that matches the customer's profile or preferences, and/or identify products that the customer is likely to be qualified for based on an assessment of some or all of the customer information. A credit bureau may be a company that compiles credit histories on prospective borrowers and provides credit reports to lenders. Lenders use these reports when making decisions on extending credit. The three major credit bureaus are Equifax®, Experian® and TransUnion®.

Product matching may refer to a process of selecting one or more financial products based on customer information/preference and qualification criteria/features of the one or more financial products. Product matching may include a prequalification and/or a qualification process for a given financial product. Real time product matching may refer to determining a selection of financial products that are matched with a customer and providing the products to the customer for selection while the customer is waiting. A real time process may respond to a request or event fast enough to satisfy certain functional or technical requirements. For instance, a communication session may be established between a customer and a real time product matching system. The customer may submit customer data and inquire about financial products during the communication session. The real time product matching system may select financial products upon the customer's request and present the selection of financial products to the customer during the same communication session (i.e., in real time).

FIG. 1 illustrates an exemplary environment 100 for implementing real time product matching (RTPM) consistent with certain disclosed embodiments of the present invention. As shown in FIG. 1, RTPM environment 100 may comprise a communication network 105, one or more customers 110, an agent 115, a financial institution 120, and an RTPM architecture 130.

Communication network 105 may be any type of wireline or wireless communication network for exchanging or delivering information or signals, such as the Internet, a wireless local area network (LAN), or any other network. Thus, communication network 105 may be any type of communications system. For example, each member of RTPM environment 100, such as customers 110 and financial institution 120, may generate inquiries or respond to inquiries using communication network 105.

Customers 110 may each represent a consumer who is interested in qualifying for a financial product, such as a credit card, a loan, an insurance policy, etc. A customer 110 may be any present or potential consumer of products and services provided by financial institution 120. Further, a customer 110 may be an individual, a group of individuals, a business entity, a nonprofit organization, etc. A customer 110 may be associated with one or more computer systems, which may interface with communication network 105 to exchange information with financial institution 120. Although FIG. 1 shows two customers 110, RTPM environment 100 may include any number of customers.

Agent 115 may represent any type of proxy that may enter data for a customer 110 to inquire whether the customer 110 qualifies for a financial product, such as a credit card, a loan, an insurance policy, etc. Agent 115 may be an individual, a group of individuals, a business entity, a nonprofit organization, etc. Agent 115 may be associated with one or more computer systems, which may interface with communication network 105 to exchange information with financial institution 120. Although FIG. 1 shows one agent 115, RTPM environment 100 may include any number of agents.

Financial institution 120 may represent any individual, group, and/or business entity that provide financial products and services to one or more consumers, such as customers 110. For example, financial institution 120 may be any type of organization managing monetary transactions, such as a bank, a credit card company, etc. Financial institution 120 may implement a computer system or related infrastructure for providing financial products and services. Also, in accordance with certain embodiments, financial institution 120 may offer one or more financial products to a customer 110 who is prequalified. RTPM environment 100 may include one or more financial institutions 120.

RTPM architecture 130 may be a computer system including hardware/software that enables collaboration among members of RTPM environment 100, such as customers 110 and financial institution 120. RTPM architecture 130 may generate, maintain, update, delete, and present customer data records and financial product data records. RTPM environment 100 may include one or more RTPM architectures 130.

In one embodiment, financial institution 120 may be a credit card company that offers and provides a set of credit cards. Agent 115 may be a bank manager. Agent 115 may submit data for a bank customer (not shown in FIG. 1) through RTPM architecture 130 to inquire from financial institution 120 which credit cards the bank customer may now be prequalified to receive. Agent 115 may submit customer data, such as name, address, credit rating, etc., to RTPM architecture 130. Financial institution 120 may use RTPM architecture 130 to compare the customer data provided by agent 115 with qualification criteria related to each of the credit cards offered by financial institution 120. Based on the comparison, financial institution 120 may identify one or more credit cards that the bank customer is prequalified to receive.

In another embodiment, financial institution 120 may be a credit card company that offers and provides a set of credit cards. Customer 110-1 may use RTPM architecture 130 to inquire from financial institution 120 which credit cards customer 110-1 may now be prequalified to receive. Customer 110-1 may place customer data, such as name, address, credit rating, etc., to RTPM architecture 130. Financial institution 120 may use RTPM architecture 130 to compare the customer data provided by customer 110-1 with qualification criteria related to each of the credit cards offered by financial institution 120. Based on the comparison, financial institution 120 may identify one or more credit cards that customer 110-1 is prequalified to receive.

For example, financial institution 120 may require that only customers with more than five years of credit history can qualify for credit card A. Credit history may refer to a record of a customer's past borrowing and repaying activities, including information about late payments, bankruptcy, etc. The length of credit history may refer to the duration of time that a customer has had a record of borrowing and payment activities. The credit history information, including the length of the credit history, may be used by financial institution 120 (e.g., a credit card company) to determine a customer's credit worthiness. Credit worthiness may refer to a quantitative value reflecting a customer's means and willingness to repay debt. Financial institution 120 may determine whether to extend credit, and on what terms, based on a customer's credit worthiness.

Customer 110-1 may submit customer data through RTPM architecture 130. Thus, based on customer data, financial institution 120 may determine that customer 110-1 prequalifies for credit card A. Further, financial institution 120 may select one or more other credit cards for which customer 110-1 pre-qualifies, and present selected credit cards to customer 110-1 through RTPM architecture 130.

Figure 2A:
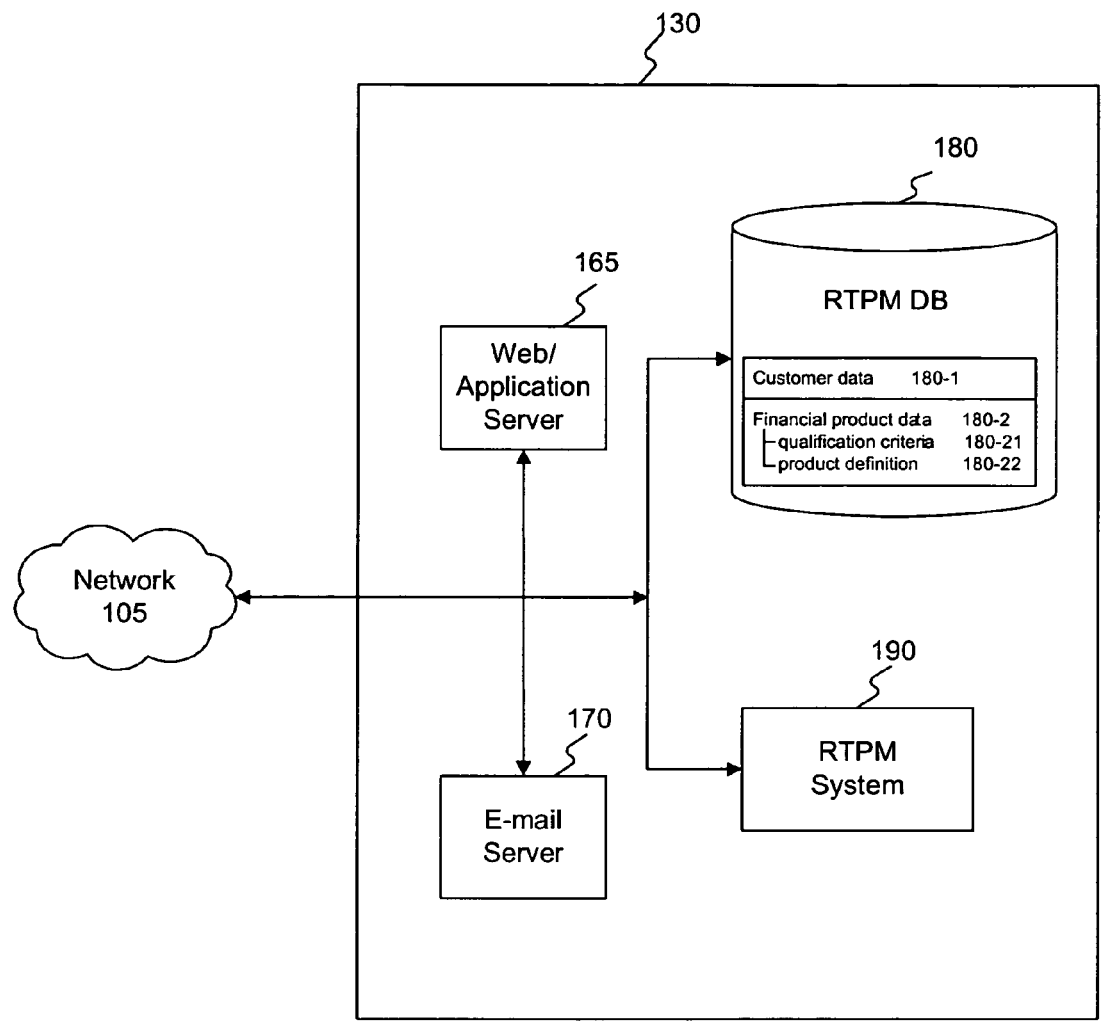
FIG. 2A is a block diagram of an exemplary real time product matching architecture consistent with certain disclosed embodiments of the present invention.

FIG. 2A is a block diagram illustrating an RTPM architecture 130 consistent with certain disclosed embodiments of the present invention. RTPM architecture 130 may include a Web/application server 165, an e-mail server 170, an RTPM database 180, and an RTPM system 190. Web/application server 165 and e-mail server 170 interface with network 105. Web/application server 165 may also be connected to e-mail server 170, RTPM database 180, and RTPM system 190. It is contemplated that RTPM architecture 130 may include fewer, all, or more components than those shown in FIG. 2A.

Web/application server 165 may include an interface that allows members of RTPM environment 100 to access and edit data records in RTPM database 180 and/or RTPM system 190. Further, Web/application server 165 may generate a notification, such as an e-mail, that is sent to one or more members of RTPM environment 100. The notification may indicate that the RTPM architecture 130 has completed an operation or a record has been received.

Web/application server 165 may also include additional components, such as collaboration tools to permit collaboration of members of RTPM environment 100, bulletin boards to permit individuals of RTPM environment 100 to communicate with each other, and/or search engines to provide efficient access to specific entries in RTPM database 180 or RTPM system 190. In one embodiment, Web/application server 165 may be an Apache HTTP Server from the Apache Software Foundation, IBM WebSphere, or any other Web/application server known in the art.

E-mail server 170 may be a computer system or software executed by a processor that is configured to provide e-mail services for members of RTPM environment 100. The e-mail services may provide messages including current information from RTPM architecture 130. For example, when customer 110-1 qualifies for a financial product, such as a loan, financial institution 120 may use e-mail server 170 to send a message to customer 110-1 indicating the qualification.

RTPM database 180 may be a database computer system and/or software executed by a processor that is configured to store data records, entries for changes made to the data records, and other information used by members of RTPM environment 100. RTPM architecture 130 may include one or more RTPM databases 180.

In one embodiment, RTPM database 180 may store customer data records 180-1. A customer data record 180-1 may include data related to a customer 110, such as the customer's name, address, household income, credit rating, etc. A customer data record 180-1 may be created from data submitted by a customer 110, or from data retrieved by RTPM system 190, or other systems external to RTPM architecture 130 (not shown in FIG. 2A).

FIG. 2B illustrates one exemplary customer data record 180-1 consistent with certain disclosed embodiments of the present invention. For example, customer data record 180-1 may be associated with customer A and include customer data, such as the customer's name, address, credit rating, etc. In this example, customer data record 180-1 includes a credit history field 180-11 showing customer A has a credit history duration of over five years.

Referring back to FIG. 2A RTPM database 180 may also store financial product data record 180-2 related to a financial product. A financial product data record 180-2 may include a qualification criteria data record 180-21 and a product definition data record 180-22. A qualification criteria data record 180-21 may include data related to qualification criteria for a financial product. A product definition data record 180-22 may include data related to the terms related to a financial product (e.g., annual fee, credit limit, etc.).

FIG. 2C illustrates two exemplary financial product data records 180-2 consistent with certain disclosed embodiments of the present invention. For example, as shown in FIG. 2C, RTPM database 180 may store a financial product data record 180-2-1 associated with credit card A. Financial product data record 180-2-1 may include qualification criteria data record 180-21-1 and product definition data record 180-22-1. Qualification criteria data record 180-21-1 may reflect the qualification criteria for credit card A, i.e., credit card A may only be offered to customers with over five years of credit history. Product definition data record 180-22-1 may include data reflecting the terms of credit card A, such as the annual percentage rate (APR), annual fee, credit card benefits, and the like.

Similarly, financial institution 120 may also offer credit card B to its customers. Financial institution 120 may create financial product data record 180-2-2 related to credit card B. Financial product data record 180-2-2 may include a qualification criteria data record 180-21-2 and a product definition data record 180-22-2. Qualification criteria data record 180-21-2 may indicate that credit card B may only be offered to customers residing in a general geographic location (e.g., first three digits of zip code equal to "200"). Product definition data record 180-22-2 may include data reflecting terms of credit card B, such as the annual percentage rate (APR), annual fee, credit card benefits, and the like.

Returning to FIG. 2A, RTPM system 190 may be a computer system or software executed by a processor that is configured to provide access to records stored in a number of different formats, such as word processing format, spread sheet format, presentation format, and the like. RTPM system 190 may enable members of RTPM environment 100 to create, update, and/or delete customer data records 180-1 and financial product data records 180-2. Upon request, RTPM system 190 may compare a customer data record 180-1 with a financial product data record 180-2 and determine whether the respective customer pre-qualifies for the financial product.

Following the examples related to credit card A and customer A, through RTPM system 190, customer A may inquire to receive information regarding credit card(s) customer A may be prequalified to receive. For example, customer A may submit customer data record 180-1 to RTPM system 190. The customer data record 180-1 may reflect that customer A has a credit history of over five years (FIG. 2B, 180-11). RTPM system 190 may create a customer data record 180-1 associated with customer A based on the submitted customer data. RTPM system 190 may store the submitted customer data record 180-1 in RTPM database 180. Further, RTPM system 190 may search RTPM database 180 for data related to all of the credit cards offered by financial institution 120. RTPM system 190 may compare customer A's customer data record 180-1 (e.g., FIG. 2B, 180-11, credit history of over five years) to the qualification criteria data record 180-21 of credit card A (e.g., FIG. 2C, 180-21-1 requiring a credit history of over five years) included in financial data record 180-2-1. RTPM system 190 may decide that, based on the customer data 180-11 for customer A and the qualification criteria data record 180-21-1 for credit card A, customer A pre-qualifies for credit card A. RTPM system 190 may similarly find other credit cards that customer A may be prequalified to receive. RTPM system 190 may then present the selection of credit cards, such as credit card A, to customer A.

Figure 3:
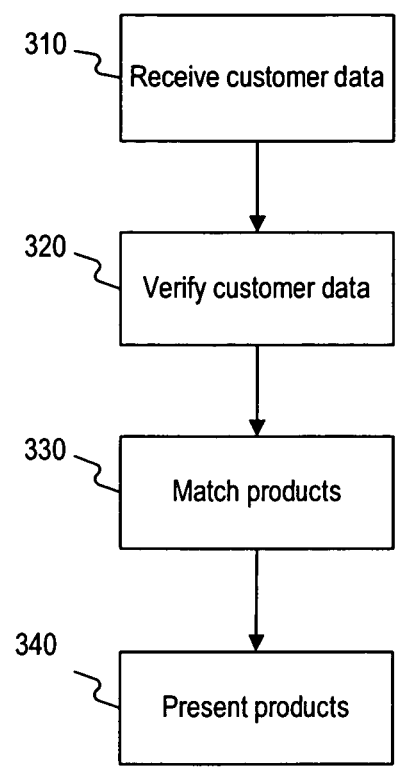
FIG. 3 is a flow chart of an exemplary real time product matching process consistent with certain disclosed embodiments of the present invention.

FIG. 3 illustrates a flow chart of an exemplary RTPM process consistent with certain disclosed embodiments of the present invention. First, a customer 110 may inquire for financial products that the customer 110 may be prequalified to receive through RTPM architecture 130. In one embodiment, RTPM system 190 may electronically present a form to customer 110. Customer 110 may complete the form and submit it to RTPM system 190. RTPM system 190 may receive and process the customer data submitted in the form, including data reflecting customer 110's name, address, social security number, etc. (step 310).

FIG. 4 illustrates an exemplary form for customers 110 to submit customer data to RTPM architecture 130 when inquiring for financial products. As shown in FIG. 4, a customer 110 may enter identification, such as name 410 (e.g., Jane Doe), address 420, zip code 430 (e.g., 20001), social security number 435, etc. Customer 110 may also enter data reflecting a preference 440 related to one or more features associated with a credit card, such as whether the customer prefers a credit card with a lower interest rate over another card with cash back on purchases. Customer 110 may also enter credit history data 450 and 460, such as an estimate of the customer's credit rating (450—excellent credit), and how long the customer has held a financial product, such as a credit card or a loan (460—three to five years).

RTPM system 190 may specify one or more rules regarding how to evaluate the customer's inquiry. For example, RTPM system 190 may define a rule that in order to qualify for "excellent credit" 451, a customer 110 has to satisfy the following criteria: (1) have a credit history including a loan or credit card for at least three years; (2) have a credit card with a credit limit greater than $10,000; (3) have never been more than sixty days late on a credit card, medical bill or loan payment; and (4) have never declared bankruptcy. RTPM system 190 may define other credit ratings (above average, needs some improvement, etc.) under credit history data 450 with other criteria. In this example, customer 110 meets the four criteria for "excellent credit" 451 and, thus, may select excellent credit rating 451 on the form. Further, customer 110 may also be required to enter a secure code 470 to demonstrate that the customer is a real person, and not an automated software program, such as a web crawler trying to enter RTPM architecture 130. A web crawler refers to a software program or an automated script that enters web sites in a methodical, automated manner. Web crawlers are often used to gather specific types of information from visited web pages, such as harvesting e-mail addresses and other information. In one embodiment, to prevent such an automated program from entering RTPM architecture 130, Human Interaction Proofs (HIPs) may be implemented that discourage automated script attacks. The implemented HIPs may be challenges configured to be easily solved by humans while remaining too difficult to be solved by computer programs. For instance, a HIP challenge may be a pixel image of distorted characters, such as the distorted secure code 480, as shown in FIG. 4. Because a large number of the automated crawler programs cannot recognize characters in the distorted image (e.g., "533j"), a HIP challenge may prevent automated programs from entering RTPM architecture 130.

Customer 110 (Jane Doe) may easily recognize the characters and enter the string of corresponding characters (i.e., "533j") in security code data field 470. In response to a correct security code, financial institution 120 may authorize customer 110 to enter RTPM architecture 130. Financial institution 120 may also implement other HIP challenges and related methods/software programs in RTPM system 190 to prevent unauthorized automated software programs, such as crawler programs, from entering the RTPM architecture 130 and accessing data.

In one embodiment, customer 110 (Jane Doe) may submit the customer data to RTPM system 190 by clicking on a button 490. After receiving the customer data entered in the form shown in FIG. 4, RTPM system 190 may store the data as one or more customer data records 180-1 in RTPM database 180.

Returning to FIG. 3, after receiving data from customer 110, RTPM system 190 may verify the customer data record 180-1 submitted by customer 110 (step 320). RTPM system 190 may verify the accuracy of the received customer data record 180-1 against data maintained within RTPM architecture 130, such as data in RTPM database 180. RTPM system 190 may also verify the accuracy of the received customer data record 180-1 against data sources external to RTPM architecture 130, such as an external credit rating database provided by credit bureaus (e.g., Experian®, Trans Union®, etc.). Alternatively, RTPM system 190 may not verify customer data record 180-1 submitted, and instead proceed to match financial products with a prequalified customer 110.

Data sources external to RTPM architecture 130 may also include data related to a customer's prior or current accounts with one or more financial institutions and non-financial data related to the customer, such as subscriptions and memberships, demographic data, geographical data, preferences in various products and services, etc. RTPM system 190 may also retrieve data related to a customer from external data sources, and use the retrieved information to match financial products with a prequalified customer. Further, RTPM system 190 may use data retrieved from external data sources to enhance or replace customer data record 180-1 submitted in step 310. RTPM system 190 may update customer data record 180-1 to reflect the enhanced information about the customer. RTPM system 190 may used the updated data record 180-1 to match financial products with a prequalified customer.

In one embodiment, customer 110 (Jane Doe) may submit customer data from a secured web site, such as web site A. RTPM system 190 may be configured to verify all customer data 180-1 received from website A against an external database A provided by one or more credit bureaus, such as Experian®. RTPM system 190 may query external database A to retrieve customer 110 information.

For example, as shown in FIG. 4, customer 110 (Jane Doe) may submit data reflecting an excellent credit rating 451. RTPM system 190 may search the external database A to verify that the customer data for customer 110 is consistent with the data submitted through website A. Also, with regard to credit ratings, RTPM system 190 may retrieve data from external database A to verify that customer 110 has never declared bankruptcy (exemplary criteria for "excellent" credit rating). If RTPM system 190 determines that customer data 180-1 submitted by customer 110 (Jane Doe) is not consistent with the data in external database A, RTPM system 190 may display an appropriate message to customer 110 via website A. As a result, RTPM system 190 may send a request to customer 110 to correct any incorrect data in the customer data form submitted to RTPM system 190.

If RTPM system 190 determines that customer data record 180-1 submitted by customer 110 (e.g., Jane Doe) is not consistent with the data in external database A, RTPM system 190 may select to base its further process on either the customer data record 180-1 submitted by customer 110 or the data retrieved from external database A. RTPM system 190 may also flag customer 110's application for data inconsistency. RTPM system 190 may check for potential identify theft and/or trigger other fraud detection processes based on this flag. RTPM system 190 may also factor data inconsistency in the decision process and match customer 110 with a different product offer. For example, RTPM system 190 may decide that such data inconsistency indicates that customer 110 (e.g., Jane Doe, FIG. 4) may have a lower credit rating than the credit rating submitted through web site A (i.e., "excellent credit" 451). As a result, RTPM system 190 may not match customer 110 with credit cards that require qualification criteria including an "excellent credit" rating.

In another embodiment, RTPM system 190 may verify the received customer data record 180-1 against data from a database within RTPM architecture 130. For example, customer 110 (e.g., Jane Doe) may have an existing account with financial institution 120. As such, RTPM database 180 may contain existing customer data for customer 110. Accordingly, RTPM system 190 may verify the received customer data record 180-1 against existing customer data in RTPM database 180. RTPM system 190 may notify customer 110 if the submitted customer data record 180-1 is not consistent with existing customer data in RTPM database 180, and request customer 110 to correct and resubmit her customer data record 180-1.

Additionally, RTPM system 190 may consider individual-based gaming rules when verifying customer data record 180-1. Individual-based gaming rules may refer to any method or logic implemented by RTPM system 190 to prevent individuals from deceiving RTPM system 190. Individual-based gaming rules may require RTPM system 190 to look up an individual's past activities in RTPM architecture 130. RTPM system 190 may implement individual-based gaming rules to prevent individuals from repeatedly entering the system with no genuine interest in the financial products offered by financial institution 120.

In one embodiment, financial institution 120 may use RTPM system 190 to track a customer's potential interest in a new credit card, such as credit card B, by counting the number of prequalifications for the credit card. For example, one or more individuals may repeatedly enter RTPM system 190 to inquire about credit card B with the intention to form a false appearance of interest. Without considering individual-based gaming rules, RTPM system 190 may consider these inquires as genuine customer requests and prequalifications indicating a customer's interest in credit card B. To prevent such repetitive inquires, RTPM system 190 may implement an individual-based gaming rule that tracks the number of inquiries received from the same individual within a predetermined time period, and to define a limit on the number of inquiries allowed within that time period. RTPM system 190 may implement one or more individual-based gaming rules using a cookie. RTPM system 190 may maintain one or more counters in a cookie placed on a customer's computer. Each time the customer accesses RTPM architecture 130, RTPM system 190 may check the counters to see whether the customer has exceeded the allowed number of inquiries. Alternatively, RTPM system 190 may keep a system log to track a customer's internet protocol address (IP address) and/or the media access control identification (MAC ID). Each time a customer accesses the RTPM system 190, the system may check the log file to see whether the IP address or the MAC ID has exceeded the number of inquiries allowed.

For example, RTPM system 190 may apply a gaming rule that limits a customer's submission to six inquiries within a twenty-four hour period. Thus, if customer 110 (e.g., Jane Doe) submits too many credit card inquiries within the predetermined time period, RTPM system 190 may not allow further submissions by customer 110. As a result, RTPM system 190 may direct customer 110 to another web page, and lock customer 110 from accessing RTPM architecture 130 for a predetermined time period. Alternatively, RTPM system 190 may permit customer 110 to access RTPM architecture 130 even after customer 110 exceeded the threshold (e.g. six). Further, RTPM system 190 may use this information (i.e., information reflecting that customer 110 has exceeded a number of permitted inquiries) when matching customer 110 with financial products.

Returning to FIG. 3, once RTPM system 190 verifies customer data record 180-1, RTPM system 190 may determine one or more financial products that customer 110 is prequalified to receive from financial institution 120 (step 330). In one embodiment, RTPM database 180 may contain financial product data records 180-2 for a set of credit cards, such as credit cards A-D.

For example, referring back to example customer 110 (Jane Doe) shown in FIG. 4, customer 110's credit history data 460 may indicate that customer 110 had less than five years of credit history. In this example, as shown in FIG. 2C, to qualify for credit card A, a customer needs to have more than five years of credit history (FIG. 2C, credit card A, 180-21-1). As such, RTPM system 190 may determine that customer 110 (Jane Doe) may not prequalify for credit card A. As shown in FIG. 2C, to qualify for credit card B, a customer needs to reside in a zip code starting with the first three digits of "200" (FIG. 2C, credit card B, 180-21-2). Because in this example, customer 110 (Jane Doe) resides in zip code 20001 (FIG. 4, address 430), RTPM system 190 may determine that customer 110 may prequalify for credit card B. Similarly, customer 110 may qualify for other credit cards, such as credit cards C and D (not shown).

In another embodiment, RTPM system 190 may select financial products with features that match one or more preferences of customer 110. Referring back to the example shown in FIG. 4, customer 110 (Jane Doe) may prefer a credit card with cash back on purchases (FIG. 4, 440). Based on this information, RTPM system 190 may search RTPM database 180 to select credit cards with cash back benefits. For example, a credit card E (shown in FIG. 5) may offer a card holder 2% cash back on gas and grocery purchases and 1% on other purchases. RTPM system 190 may thus select credit card E to be presented to customer 110 (Jane Doe).

In other embodiments, RTPM system 190 may also select default financial products that may be presented to customer 110. For example, when a customer 110 submits an incomplete customer data record 180-1, RTPM system 190 may not be able to match customer 110 with a particular financial product offered. Accordingly, RTPM system 190 may be configured to match customer 110 with one or more default products that customer 110 may still prequalify to receive had customer 110 provided complete customer data. A default financial product may be a product that has less strict qualification criteria for customers. For example, a default financial product may be a credit card with a low credit line that may be offered to any customer with a valid social security card.

Returning to FIG. 3, after selecting prequalified financial products for customer 110, RTPM system 190 may present a list of the selected products to the customer 110 (step 340). If the number of financial products that a customer may be prequalified to receive exceeds a threshold, RTPM system 190 may determine the number of prequalified financial products to display by ranking the available offers. RTPM system 190 may rank offers by one or more factors. For example, RTPM system 190 may rank offers by customer preference. Customer 110 (e.g., Jane Doe) may submit data indicating that she prefers the "cash back" feature on her credit card purchases. RTPM system 190 may thus rank credit card E higher than credit cards that do not offer the cash back feature.

In one embodiment, RTPM system 190 may rank financial products by calculating ranking scores using one or more scalar products. FIGS. 5A and 5B illustrate a scoring process for ranking two credit cards F and G for a customer, using scalar products. RTPM system 190 may rank credit cards F and G by calculating a ranking score for each credit card. In this example, customer B has pre-qualified for many credit cards including credit cards F and G. Credit card F may provide a cardholder with rewards (e.g., miles) that are awarded based on purchases made using the card. Credit card G may have lower fees in relation to other credit cards. In one embodiment, RTPM 190 may rank credit cards F and G to determine whether/how they may be presented to customer B.

As shown in FIG. 5A, RTPM system 190 may define multi-dimensional answer vectors, shown as a three-dimensional answer vectors as shown in column 510 based on three different customer data 501, 502, and 503. For example, when customer B 520 submits customer data indicating that the customer has excellent credit 530, is interested in miles awards 540, and is a student 550, RTPM system 190 may generate a three-dimensional answer vector for customer B, such as (1, 1, 1). Alternatively, if a customer C (not shown) submits information indicating that customer C has fair credit rating, is interested in cash back, and is not a student, the three-dimensional answer vector for customer C may be represented as (0,0,0). It should be noted that embodiments of the present invention may use any type of data values to create the multi-dimensional answer vectors generated and processed by RTPM system 190.

As shown in FIG. 5B, RTPM system 190 may define three-dimensional weight vectors for credit cards F and G corresponding to customer data 501, 502, and 503. Additionally, as shown in column 560 of FIG. 5B, RTPM 190 may assign weights for credit card F corresponding to each answer extracted from the customer data. According to the assigned weights stored in column 560 and customer B's answers (See e.g., FIG. 5A), RTPM system 190 may create a three dimensional weight vector for customer B related to credit card F equal to (1,1, 0.5). As another example, as shown in column 570 of FIG. 5B, for credit card G, RTPM 190 may assign weights for each answer extracted from the customer data for credit card G. According to the assigned weights in column 570 and customer B's answers (See e.g., FIG. 5A), the weight vector for customer B related to credit card G equals to (0.25, 0, 0.25).

RTPM system 190 may then determine the score for credit cards F and G by calculating the vector products of the answer vector and weight vectors. RTPM system 190 may be configured to calculate the scalar product for customer B and credit card F using one or more algorithms executed by a processor. For example, RTPM system 190 may calculate the scalar product for customer B as follows:

$$\Sigma(1, 1, 1) \times (1, 1, 0.5) = 1+1+0.5 = 2.5;$$

and the scalar product for customer B and Credit Card F as follows:

$$\Sigma(1, 1, 1) \times (0.25, 0, 0.25) = 0.25+0+0.25 = 0.5.$$

As such, for customer B, credit card F scored higher than credit card G (i.e., 2.5>0.5), and therefore may be ranked in front of credit card G.

RTPM system 190 may apply the scalar product calculation to multiple customer characteristics and financial product features to rank financial products. For example, RTPM system 190 may define key characteristics of customer data, such as risk, preference for airlines miles product, sensitivity to fees, etc. RTPM system 190 may use a first scalar product of two vectors to score each key characteristic of customer data. The two vectors may be: (1) an answer vector defined by answers extracted from submitted customer data, and (2) a weight vector defined by weights assigned to the key customer characteristics. RTPM system 190 may then use a second scalar product to calculate a ranking score for each financial product. The two vectors for the second scalar product may be: (1) a customer data score vector defined by the scores for each key characteristic of customer data, and (2) a weight vector defined by weights assigned to each key customer characteristic for the relevant financial product.

After ranking the prequalified financial products, RTPM system 190 may present a list of highly ranked products to customer 110. FIG. 6 illustrates an exemplary selection of financial products consistent with certain disclosed embodiments of the present invention. In the above example of customer 110 (Jane Doe) and credit cards A, B, C, D, and E, RTPM system 190 may determine that customer 110 does not prequalify for credit card A. However, RTPM system 190 may determine that customer 110 prequalified for credit cards B, C, and D. RTPM system 190 may also select credit card E to be presented to customer 110 because credit card E offers features sought by customer 110 (e.g., cash back on purchases). As a result, RTPM system 190 may present credit cards B, C, D, and E to customer 110 (Jane Doe). As shown in FIG. 6, upon submitting customer data, customer 110 (Jane Doe) may be presented, in real time, with a list of prequalified credit cards (i.e., credit cards B, C, and D) and any potential financial products customer 110 may have an interest (i.e., credit card E). Because customer 110 (Jane Doe) does not prequalify for credit card A, RTPM system 190 may not display credit card A in the presented list. Customer 110 (Jane Doe) may compare credit cards B, C, D, and E, offered by financial institution 120. Customer 110 (Jane Doe) may apply for one or more of the preselected credit cards from the selection, in real time, using RTPM system 190.

The disclosed embodiments may be applied to the qualification process for financial products. For example, to qualify for a financial product, a customer 110 may provide a social security number to a financial institution 120. RTPM system 190 may receive and store the social security number from customer 110. Financial institution 120 may use RTPM system 190 to check the customer's credit history using the social security number. Financial institution 120 may also verify the customer's identification and credit worthiness by checking customer 110's data in databases internal (e.g., RTPM database 180) or external to RTPM architecture 130 (e.g., credit rating databases offered by Experian®, Trans Union®, etc.). Financial institution 120 may use RTPM system 190 to compare the verified customer data and customer credit history to the qualification criteria of each credit card offered, and to present a list of qualified credit cards for customer 110.

The disclosed embodiments may be used to provide real time product matching for different types of financial products, such as loans, mortgages, insurance policies, etc. The disclosed embodiments consistent with the present invention may further be used by one or more financial institutions to provide customers, in real time, with a selection of financial products through one user interface. For example, a credit card company and a bank may share the use of RTPM environment 100. RTPM database 180 may contain financial product data records 180-2 for financial products offered by both financial institutions. RTPM system 190 may receive customer data record 180-1 and match the customer data record 180-1 with financial products offered by both financial institutions. RTPM system 190 may also present a selection of prequalified products to the customer. For example, referring to FIG. 6 as an exemplary selection of prequalified financial products, credit cards B and C may be offered by the credit card company and credit cards D and E may be offered by the bank. Customer 110 may chose to apply from the list of prequalified financial products from both financial institutions. RTPM system 190 may further process customer 110's application in real time and notify customer 110 whether customer 110 is qualified and/or approved for the selected products.

The disclosed embodiments may also be used by a financial institution 120 in various customer interactions. For example, financial institution 120 may use RTPM system 190 when processing customer service calls to match customers with financial products in real time. Financial institution 120 may also use RTPM system 190 during promotion calls to customers to match them with financial products in real time. Financial institution 120 may also partner with other companies and use RTPM system 190 when processing customer service inquiries/requests (for the partner company's products) to match customers with financial products provided by financial institution 120 in real time. Further, financial institution 120 may embed a link to the RTPM system 190 on a web page by using a web banner. Financial institution 120 may thus provide access to RTPM system 190 through third party environments. For example, a customer may initiate the process of finding a credit card that meets their needs from a banner in their Yahoo® email environment.

Further, a financial institution 120 may use the disclosed embodiments to improve the real time product matching process. RTPM system 190 may assign customers to different test groups. Each group of customers may access an RTPM architecture 130 with customized designs. Each RTPM architecture 130 may use a unique design of customer interfaces, a specific order to question a customer, and specific decision rules to match a customer with financial products. RTPM system 190 may track customer reactions and satisfaction ratings for each test group. The financial institution 120 may compare customer experiences among the test groups to improve the product matching process.

The disclosed embodiments may be implemented to collect customer data in multiple iterations and match the customer with financial products in real time. For example, RTPM system 190 may collect a first set of customer data from a customer. Based on the first set of customer data, RTPM system 190 may present the customer with additional questions and/or provide the customer with more choices. Through such iterations, RTPM system 190 may narrow down the customer's preferences and choices, and proceed to match the customer with financial products.

Moreover, the disclosed embodiments may be used by customers to request financial products with customized features. For example, a customer may use RTPM system 190 to specify one or more features (e.g., frequent flyer miles, no annual fee, etc.) that he would like in a credit card. RTPM system 190 may match the customer with credit cards having the specified features. Alternatively, a customer may indicate acceptable ranges of one or more features, such as the maximum acceptable APR for a credit card. RTPM system 190 may match the customer with credit cards that satisfy the acceptable ranges (e.g., credit cards with APR lower than the maximum APR), and present a selection of these credit cards to the customer.

The disclosed embodiments consistent with the present invention may be implemented in various environments, including computer-based environments that use, for example, personal computers, workstations, servers, laptops, personal digital assistants (PDAs), mobile phones, handheld devices, and the like. The disclosed embodiments may also be implemented using other types of electronic and non-electronic environments, such as, for example, postal mail, radio, and television systems and/or infrastructures. The present invention, however, is not limited to such examples, and embodiments consistent with the present invention may be implemented using other types of environments, platforms, and/or infrastructures.

The disclosed embodiments consistent with the present invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). Such networks may include a wired and/or wireless network, such as, for example, a local area network (LAN), a wide area network (WAN), storage area network (SAN), a public switched telephone network (PSTN), an Integrated Services Digital Network (ISDN), an infrared (IR) link, a radio link, such as a Universal Mobile Telecommunications System (UMTS), Global System for Mobile Communications (GSM), Code Division Multiple Access (CDMA), broadcast radio network, cable television network, and a satellite link.

Further, embodiments consistent with the present invention may be implemented using various types of transmission protocols and data formats, such as, for example, transmission control protocol/internet protocol (TCP/IP), hyper text transfer protocol (HTTP), secure HTTP, wireless application protocol (WAP), hyper text markup language (HTML), extensible markup language (XML), Standard Generalized Markup Language (SGML), etc.

Accordingly, systems and methods consistent with embodiments of the present invention provide a selection of prequalified financial products to customers in real time. While certain features and embodiments of the invention have been described, other embodiments of the invention will be apparent to those skilled in the art from consideration of the specification and practice of the embodiments of the invention disclosed herein.

It is intended, therefore, that the specification and examples be considered as exemplary only, with a true scope and spirit of the embodiments of the invention being indicated by the following claims and their full scope of equivalents. Other embodiments of the invention will be apparent to those skilled in the art from consideration of the specification and practice of the invention disclosed herein.

What is claimed is:

1. A computer implemented method for providing real time credit card matching, comprising:
    storing one or more financial product data records associated with one or more credit cards, each financial product data record being associated with a respective credit card and indicating one or more credit card features associated with the respective credit card;
    receiving an indication of customer preferences with respect to credit card features and a self-assessed credit rating of the customer;
    generating, by one or more computer processors, a multi-dimensional answer vector for the customer based on the indication of customer preferences;

assigning a weight corresponding to each credit card feature for each respective credit card based on the financial product data records;
generating, by the one or more computer processors, a multi-dimensional weight vector for each of the one or more credit cards based on the assigned weights;
calculating, a scalar product for at least one of the one or more credit cards based on the multi-dimensional weight vector and the multi-dimensional answer vector;
assigning a score to the one or more credit cards using the scalar product;
matching the customer with one or more credit cards based on the assigned score and the self-assessed credit rating of the customer; and
displaying an offer to apply for the matched one or more credit cards to the customer.

2. The method of claim 1, the method further comprising:
retrieving data from a credit rating database; and
verifying that a customer data record associated with the customer, including the self-assessed credit rating, corresponds to the retrieved data.

3. The method of claim 2, wherein the one or more financial product data records each includes a qualification criteria data record and a product definition data record.

4. The method of claim 3, wherein matching the customer further comprises:
comparing a customer data record associated with the customer and including the self-assessed credit rating with a qualification criteria data record corresponding to a first credit card;
determining whether the customer prequalifies for the first credit card; and
selecting the first credit card as a matched credit card.

5. The method of claim 1, wherein matching the customer further comprises:
selecting a plurality of the matched one or more credit cards based on the customer preference; and
presenting an offer to apply for the selected plurality of matched credit cards.

6. The method of claim 4, wherein matching the customer further comprises:
selecting a default credit card based on the customer data when the customer does not prequalify for the first credit card; and
presenting an offer to apply for the default credit card.

7. The method of claim 1, the method further comprising:
receiving an application from the customer for the matched one or more credit cards in real time.

8. A system for providing real time credit card matching, comprising:
a computer processor; and
a memory configured to store instructions that, when executed by the computer processor, performs operations comprising:
storing one or more financial product data records associated with one or more credit cards, each financial product data record being associated with a respective credit card and indicating one or more credit card features associated with the respective credit card;
receiving an indication of customer preferences with respect to credit card features and a self-assessed credit rating of the customer;
generating a multi-dimensional answer vector for the customer based on the indication of customer preferences;
assigning a weight corresponding to each credit card feature for each respective credit card based on the financial product data records;
generating a multi-dimensional weight vector for each of the one or more credit cards based on the assigned weights;
calculating a scalar product for the one or more credit cards based on the multi-dimensional weight vector and the multi-dimensional answer vector;
assigning a score to the one or more credit cards using the scalar product;
matching the customer with one or more credit cards based on the assigned score and the self-assed credit rating of the customer, wherein the computer system is configured to match the customer with the one or more credit cards in real time; and
displaying an offer to apply for the matched one or more credit cards.

9. The system of claim 8, wherein the memory stores instructions that, when executed by the computer processor, performs operations further comprising:
retrieving data from a credit rating database; and
verifying that a customer data record associated with the customer, including the self-assessed credit rating, corresponds to the retrieved data.

10. The system of claim 9, wherein the one or more financial product data records each includes a qualification criteria data record and a product definition data record.

11. The system of claim 10, wherein the memory stores instructions that, when executed by the computer processor, performs operations further comprising:
comparing a customer data record associated with the customer and including the self-assessed credit rating with a qualification criteria data record corresponding to a first credit card;
determining whether the customer prequalifies for the first credit card; and
selecting the first credit card as the one or more matched credit cards.

12. The system of claim 8, wherein the memory stores instructions that, when executed by the computer processor, performs operations further comprising:
selecting a plurality of the matched one or more credit cards based on the customer preference; and
presenting an offer to apply for the selected plurality of matched credit cards.

13. The system of claim 11, wherein the memory stores instructions that, when executed by the computer processor, performs operations further comprising:
selecting a default credit card based on the customer data when the customer does not prequalify for the first credit card; and
presenting an offer to apply for the default credit card to the customer.

14. The system of claim 8, wherein the memory stores instructions that, when executed by the computer processor, performs operations further comprising:
receiving an application from the customer for one of the matched one or more credit cards in real time.

15. A non-transitory computer-readable medium storing instructions that, when executed by a computer processor, cause the computer processor to perform operations comprising:
storing one or more financial product data records associated with one or more credit cards, each financial product data record being associated with a respective financial product and indicating one or more credit card features associated with the respective credit card;

a receiving an indication of customer preferences of one or more credit card features and a self-assessed credit rating of the customer, generating a multi-dimensional answer vector for the customer based on the indication of customer preferences, assigning a weight corresponding to each credit card feature for each respective credit card based on the financial product data records;

generating a multi-dimensional weight vector for each of the one or more credit cards based on the assigned weights, calculating a scalar product for the one or more credit cards based on the multi-dimensional weight vector and the multi-dimensional answer vector, assigning a score to the one or more credit cards using the scalar product, and matching the customer with one or more credit cards based on the assigned score and the self-assed credit rating of the customer; and displaying an offer to apply for the matched financial products.

16. The computer-readable medium of claim 15, wherein the stored instructions, when executed by the at least one computer processor, cause the at least one computer processor to perform further operations comprising:

verifying a customer data record by applying one or more Human Interaction Proof challenges.

17. The computer-readable medium of claim 15, wherein the stored instructions, when executed by the at least one computer processor, cause the at least one computer processor to perform further operations comprising:

verifying the customer data record by applying one or more individual-based gaming rules.

18. The computer-readable medium of claim 15, wherein the stored instructions, when executed by the at least one computer processor, cause the at least one computer processor to perform further operations comprising:

matching the customer with a default financial product if the customer is not prequalified for any financial product.

19. The computer-readable medium of claim 15, wherein the stored instructions, when executed by the at least one computer processor, cause the at least one computer processor to perform further operations comprising:

receiving an application from the customer for one of the matched one or more financial products in real time.

20. The computer-readable medium of claim 19, wherein the stored instructions, when executed by the at least one computer processor, cause the at least one computer processor to perform further operations comprising:

processing the received application from the customer in real time; and generating a notification indicating whether the received application is approved.

* * * * *